(12) United States Patent
Sakurai et al.

(10) Patent No.: US 11,438,277 B2
(45) Date of Patent: Sep. 6, 2022

(54) ALLOCATION METHOD, ALLOCATING DEVICE, AND COMPUTER-READABLE RECORDING MEDIUM

(71) Applicants: FUJITSU LIMITED, Kawasaki (JP); National University Corporation KUMAMOTO UNIVERSITY, Kumamoto (JP)

(72) Inventors: Yasushi Sakurai, Kumamoto (JP); Yasuko Matsubara, Kumamoto (JP); Yasuaki Irifune, Kumamoto (JP); Saeru Yamamuro, Kumamoto (JP); Kouki Kawabata, Kumamoto (JP); Akira Ura, Yokohama (JP); Takashi Katoh, Kawasaki (JP); Yuhei Umeda, Kawasaki (JP)

(73) Assignees: FUJITSU LIMITED, Kawasaki (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 84 days.

(21) Appl. No.: 16/801,165

(22) Filed: Feb. 26, 2020

(65) Prior Publication Data

US 2020/0280525 A1   Sep. 3, 2020

(30) Foreign Application Priority Data

Feb. 28, 2019   (JP) .............................. JP2019-036210

(51) Int. Cl.
  *G06N 3/02*    (2006.01)
  *H04L 47/78*   (2022.01)
  *H04L 47/80*   (2022.01)
  *H04L 43/0805* (2022.01)
  *H04L 45/50*   (2022.01)
    (Continued)

(52) U.S. Cl.
  CPC ............. *H04L 47/781* (2013.01); *G06N 3/02* (2013.01); *H04L 43/04* (2013.01); *H04L 43/0805* (2013.01); *H04L 45/50* (2013.01); *H04L 47/801* (2013.01); *H04L 47/82* (2013.01)

(58) Field of Classification Search
  None
  See application file for complete search history.

(56) References Cited

U.S. PATENT DOCUMENTS 7,143,352 B2 * 11/2006 Divakaran .......... G06F 16/7834
                                                715/721
11,115,461 B1 * 9/2021 Kim ........................ H04L 67/06
                            (Continued)

OTHER PUBLICATIONS

Yamamuro, S., et al., "Summarizing and Grouping Time-series Data Using Deep Learning," DEIM Forum 2018, C3-3, 2018, 9 pages (with English Abstract).

*Primary Examiner* — Dhairya A Patel
(74) *Attorney, Agent, or Firm* — Xsensus LLP

(57) ABSTRACT

An allocation method executed by a computer includes dividing each of a plurality of pieces of time-series data into a plurality of segments, allocating a label to each of the pieces of time-series data based on features of each segment in the pieces of time-series data, and allocating a predetermined segment in time-series data, included in the pieces of time-series data, with a label allocated to the time-series data to which the predetermined segment belongs.

7 Claims, 18 Drawing Sheets

(51) Int. Cl.
  *H04L 47/70* (2022.01)
  *H04L 43/04* (2022.01)

(56) References Cited

U.S. PATENT DOCUMENTS

| | | | |
|---|---|---|---|
| 2008/0208363 A1* | 8/2008 | Grgic | G05B 19/042 |
| | | | 718/103 |
| 2017/0264685 A1* | 9/2017 | Tada | H04L 65/607 |
| 2018/0225519 A1* | 8/2018 | Chen | G06V 10/82 |
| 2019/0294989 A1* | 9/2019 | Koezuka | G06F 11/3447 |
| 2020/0151748 A1* | 5/2020 | Saha | G06F 16/2474 |
| 2021/0279603 A1* | 9/2021 | Teran Matus | G06N 5/04 |
| 2021/0281868 A1* | 9/2021 | Deshpande | H04N 19/188 |
| 2022/0110155 A1* | 4/2022 | Chou | H04W 24/10 |

* cited by examiner

FIG.4

| TIME-SERIES DATA NAME | SEGMENT START TIME | SEGMENT END TIME | CLUSTER ID | DEGREE OF IMPORTANCE | PREDICTED DATA LABEL |
|---|---|---|---|---|---|
| d1 | 0 | 100 | 1 | 0.8 | a |
| d1 | 100 | 170 | 2 | 0.1 | a |
| d1 | 170 | 240 | 3 | 0.4 | a |
| d2 | 0 | 80 | 2 | 0.2 | b |
| d2 | 80 | 190 | 3 | 0.9 | b |
| d2 | 190 | 240 | 1 | 0.05 | b |
| d3 | 0 | 60 | 2 | 0.15 | b |
| d3 | 60 | 120 | 1 | 0.3 | b |
| d3 | 120 | 180 | 4 | 0.03 | b |
| d3 | 180 | 240 | 2 | 0.7 | b | d1:

| TIME | FIRST VALUE | SECOND VALUE |
|---|---|---|
| 0 | 11 | 25 |
| 1 | 13 | 23 |
| 2 | 12 | 20 |
| ... | ... | ... | d2:

| TIME | FIRST VALUE | SECOND VALUE |
|---|---|---|
| 0 | 3 | 50 |
| 1 | 2 | 51 |
| 2 | 5 | 53 |
| ... | ... | ... |

FIG.9

| TIME-SERIES DATA NAME | SEGMENT START TIME | SEGMENT END TIME | CLUSTER ID | DEGREE OF IMPORTANCE | PREDICTED DATA LABEL |
|---|---|---|---|---|---|
| d1 | 0 | 100 | 1 | 0.8 | a |
| d1 | 100 | 170 | 2 | 0.1 | a |
| d1 | 170 | 240 | 3 | 0.4 | a |
| d2 | 0 | 80 | 2 | 0.2 | b |
| d2 | 80 | 190 | 3 | 0.9 | b |
| d2 | 190 | 240 | 1 | 0.05 | b |
| d3 | 0 | 60 | 2 | 0.15 | b |
| d3 | 60 | 120 | 1 | 0.3 | b |
| d3 | 120 | 180 | 4 | 0.03 | b |
| d3 | 180 | 240 | 2 | 0.7 | b |

⇩

| TIME-SERIES DATA NAME | SEGMENT START TIME | SEGMENT END TIME | CLUSTER ID | DEGREE OF IMPORTANCE | PREDICTED DATA LABEL |
|---|---|---|---|---|---|
| d2 | 80 | 190 | 3 | 0.9 | b |
| d1 | 0 | 100 | 1 | 0.8 | a |
| d3 | 180 | 240 | 2 | 0.7 | b |
| d1 | 170 | 240 | 3 | 0.4 | a |
| d3 | 60 | 120 | 1 | 0.3 | b |
| d2 | 0 | 80 | 2 | 0.2 | b |
| d3 | 0 | 60 | 2 | 0.15 | b |
| d1 | 100 | 170 | 2 | 0.1 | a |
| d2 | 190 | 240 | 1 | 0.05 | b |
| d3 | 120 | 180 | 4 | 0.03 | b |

FIG.10

Lower table (source):

| TIME-SERIES DATA NAME | SEGMENT START TIME | SEGMENT END TIME | CLUS-TER ID | DE-GREE OF IMPOR-TANCE | PRE-DICTED DATA LABEL |
|---|---|---|---|---|---|
| d2 | 80 | 190 | 3 | 0.9 | b |
| d1 | 0 | 100 | 1 | 0.8 | a |
| d3 | 180 | 240 | 2 | 0.7 | b |
| d1 | 170 | 240 | 3 | 0.4 | a |
| d3 | 60 | 120 | 1 | 0.3 | b |
| d2 | 0 | 80 | 2 | 0.2 | b |
| d3 | 0 | 60 | 2 | 0.15 | b |
| d1 | 100 | 170 | 2 | 0.1 | a |
| d2 | 190 | 240 | 1 | 0.05 | b |
| d3 | 120 | 180 | 4 | 0.03 | b |

CLUSTER IDs HAVE ALREADY APPEARED, AND IT IS ASSUMED THAT SEGMENT LABELS HAVE BEEN ALLOCATED TO CLUSTERS

CLUSTERS HAVE APPEARED FOR FIRST TIME, AND PREDICTED DATA LABELS ARE ALLOCATED TO CLUSTERS

Upper table (result) 122:

| TIME-SERIES DATA NAME | SEGMENT START TIME | SEGMENT END TIME | CLUS-TER ID | DE-GREE OF IMPOR-TANCE | PRE-DICTED DATA LABEL | SEGMENT LABEL |
|---|---|---|---|---|---|---|
| d2 | 80 | 190 | 3 | 0.9 | b | b |
| d1 | 0 | 100 | 1 | 0.8 | a | a |
| d3 | 180 | 240 | 2 | 0.7 | b | b |
| d1 | 170 | 240 | 3 | 0.4 | a | b |
| d3 | 60 | 120 | 1 | 0.3 | b | a |
| d2 | 0 | 80 | 2 | 0.2 | b | b |
| d3 | 0 | 60 | 2 | 0.15 | b | b |
| d1 | 100 | 170 | 2 | 0.1 | a | b |
| d2 | 190 | 240 | 1 | 0.05 | b | a |
| d3 | 120 | 180 | 4 | 0.03 | b | b |

ALLOCATION METHOD, ALLOCATING DEVICE, AND COMPUTER-READABLE RECORDING MEDIUM

CROSS-REFERENCE TO RELATED APPLICATION

This application is based upon and claims the benefit of priority of the prior Japanese Patent Application No. 2019-036210, filed on Feb. 28, 2019, the entire contents of which are incorporated herein by reference.

FIELD

The embodiments discussed herein are related to an allocation method, an allocation device, and a computer-readable recording medium.

BACKGROUND

A technology for allocating a label to time-series data based on features of the time-series data has been know. Time-series data allocated with labels is used as, for example, training data in supervised machine learning. Related technologies are described in Yamamuro Saeru, Matsubara Yasuko, Kawabata Kouki, Ide Yusuke, Umeda Yuhei, Furukawa Tadanobu, Okawa Yoshihiro, Maruhashi Koji, Inakoshi Hiroya, Sakurai Yasushi, "Summarization and classification of time-series data using deep learning", DEIM Forum 2018 C3-3.

SUMMARY

According to an aspect of an embodiment, an allocation method executed by a computer includes: dividing each of a plurality of pieces of time-series data into a plurality of segments; allocating a label to each of the pieces of time-series data based on features of each segment in the pieces of time-series data; and allocating a predetermined segment in time-series data, included in the pieces of time-series data, with a label allocated to the time-series data to which the predetermined segment belongs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a segment information table;

FIG. 9 is a diagram for describing sorting in a sorting method;

FIG. 10 is a diagram for describing a method for allocating a label in the sorting method;

DESCRIPTION OF EMBODIMENTS

Figure 1:
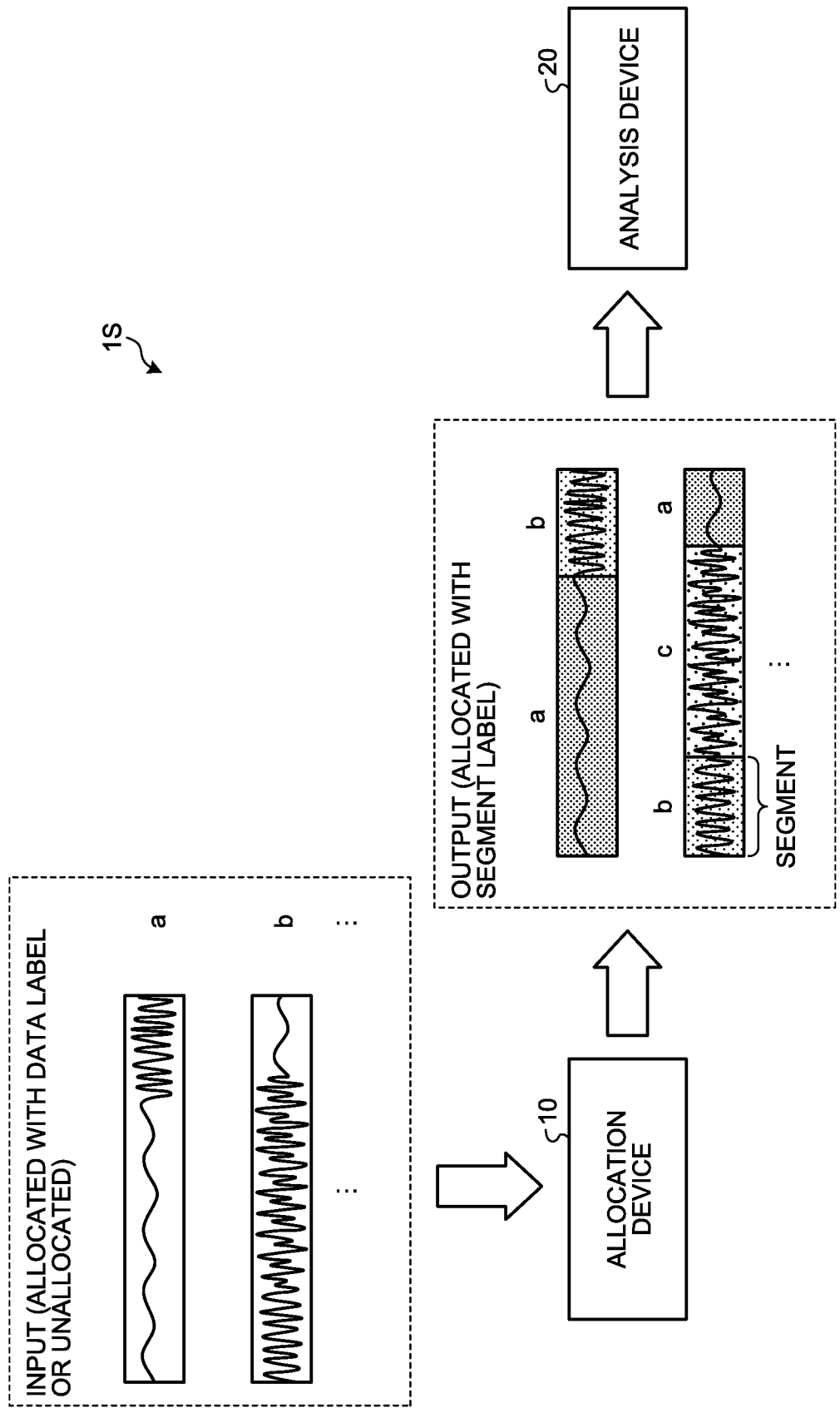
FIG. 1 is a diagram illustrating an example of a functional configuration of an analysis system according to an example.

The above-mentioned technology, however, has a problem in that it may be difficult to efficiently analyze details of time-series data.

For example, it is conceivable to use time-series data obtained during a day from an acceleration sensor worn by a worker to perform analysis for the purpose of progress management of works. In this case, the above-mentioned technology can allocate time-series data obtained during a day with one label corresponding to the representative work in that day.

Features of time-series data may change with the lapse of time. For example, a worker performs a plurality of different works during a day, and hence features of data obtained from an acceleration sensor may change when the work change. In this case, it is difficult for the above-mentioned technology to analyze the contents of works other than a representative work.

Another conceivable method is to divide time-series data based on predetermined time intervals and manually allocate labels for each time interval. This method, however, may significantly deteriorate time efficiency and accuracy of label allocation. It may be difficult to specify which label data in each time interval corresponds to.

Preferred embodiments will be explained with reference to accompanying drawings. The present invention is not limited by the examples. The examples can be combined as appropriate as long as no contraction is made.

First, time-series data in an example is described. Examples of the time-series data include sensor data obtained from an acceleration sensor and access histories of Web sites. For example, DeepPlait, which is a classification model described in Yamamuro Saeru, Matsubara Yasuko, Kawabata Kouki, Ide Yusuke, Umeda Yuhei, Furukawa Tadanobu, Okawa Yoshihiro, Maruhashi Koji, Inakoshi Hiroya, Sakurai Yasushi, "Summarization and classification of time-series data using deep learning", DEIM Forum 2018 C3-3, enables a label to be allocated to time-series data.

Labels are information indicating attributes of time-series data. For example, when time-series data is sensor data obtained from an acceleration sensor worn by a player who shoots a free throw, the label may be information indicating whether the free throw is successful or failed. When time-series data is sensor data obtained for a day from an acceleration sensor worn by a worker, the label may be information indicating a representative work performed by the worker at the day.

Time-series data may include a plurality of patterns inside. For example, time-series data generated from a monitoring system for network communication includes a normal pattern and an abnormal pattern. Sensor data obtained from an acceleration sensor worn by a worker includes various patterns depending on the contents of work for each time slot.

In the related technology, one label is allocated to one piece of time-series data. On the other hand, a label allocated to time-series data does not always correspond to all patterns included in the time-series data. In other words, in the related technology, a label corresponding to only one pattern representing the time-series data is merely allocated. Thus, for example, in the related technology, it is difficult to extract and analyze data for each pattern from a plurality of pieces of time-series data.

On the other hand, the analysis system in the example can allocate a label for each pattern included in time-series data, and can perform analysis by using the time-series data allocated with the label for each pattern.

The terms in the example are described. First, a label allocated to time-series data by a classification model is referred to as "data label". A pattern included in time-series data is referred to as "cluster". A part of time-series data corresponding to a time section sectioned for each cluster is referred to as "segment". A label allocated for each segment by the analysis system is referred to as "segment label".

Referring to FIG. 1, an analysis system is described. FIG. 1 is a diagram illustrating an example of the functional configuration of the analysis system according to the example. As illustrated in FIG. 1, an analysis system 1S includes an allocation device 10 and an analysis device 20.

The allocation device 10 is a device that allocates a segment label to each segment obtained by dividing time-series data. The allocation device 10 learns a classification model by using training data. The allocation device 10 allocates a segment label by performing predetermined postprocessing on results of classification by the learned classification model. In the following description, the allocation of a data label or a segment label by the allocation device 10 is referred to as "prediction".

The classification model may be any model that can provide a data label to time-series data, divide time-series data into segments, classify segments into clusters, and calculate a score for each segment. In the example, the classification model is DeepPlait described in Yamamuro Saeru, Matsubara Yasuko, Kawabata Kouki, Ide Yusuke, Umeda Yuhei, Furukawa Tadanobu, Okawa Yoshihiro, Maruhashi Koji, Inakoshi Hiroya, Sakurai Yasushi, "Summarization and classification of time-series data using deep learning", DEIM Forum 2018 C3-3. DeepPlait is a model using a deep neural network (DNN).

As illustrated in FIG. 1, time-series data is input to the allocation device 10. In learning of a classification model, time-series data manually allocated with a data label in advance is input to the allocation device 10. On the other hand, time-series data to be input to the allocation device 10 for prediction may be allocated with a data label, or does not need to be allocated with a data label.

The allocation device 10 outputs time-series data allocated with segment labels. A method for allocating segment labels is described later together with the configuration of the allocation device 10. The time-series data allocated with segment labels, which has been output from the allocation device 10, is input to the analysis device 20.

The analysis device 20 analyzes the time-series data allocated with segment labels. For example, the analysis device 20 may extract data in a segment allocated with a particular segment label, and analyze the extracted data. The analysis device 20 may learn a segment label and features of data on a corresponding segment, and generate a model for allocating segment labels.

Functional Configuration

Figure 2:
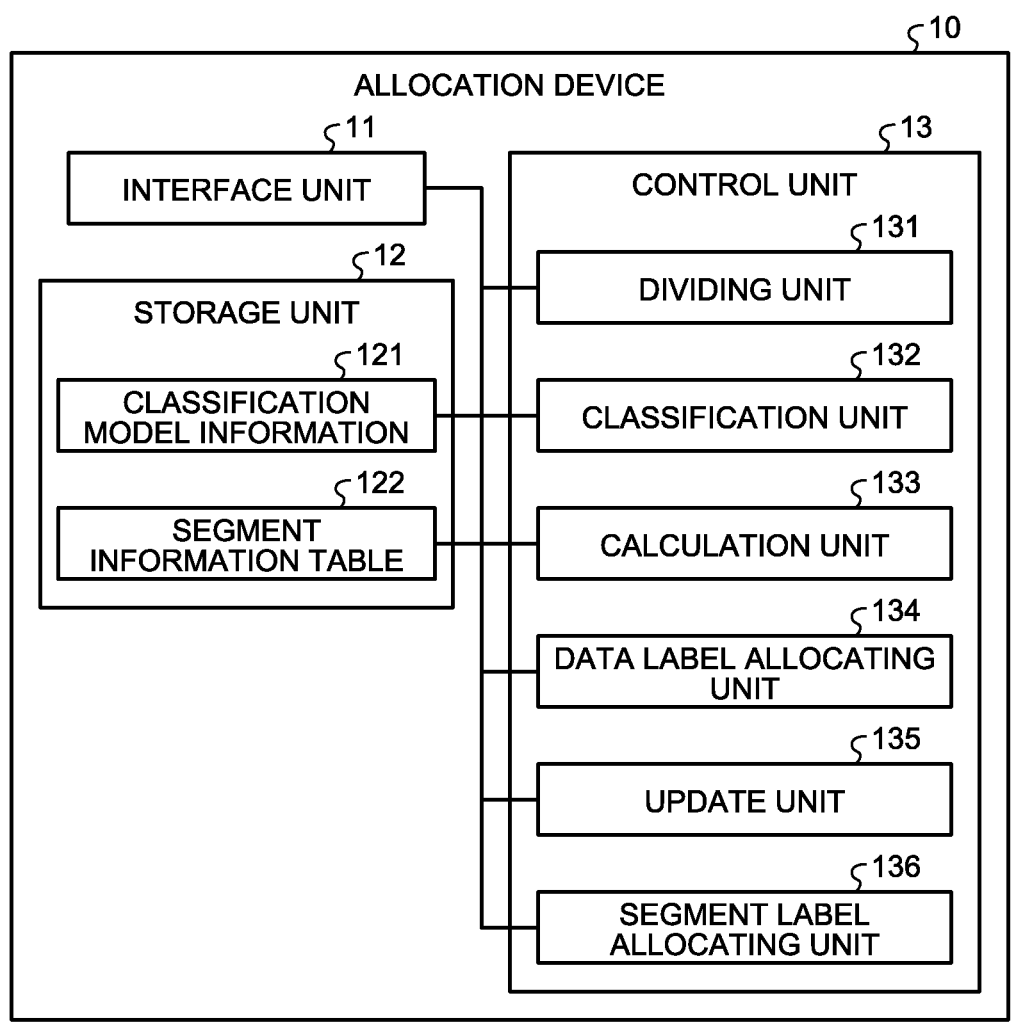
FIG. 2 is a diagram illustrating an example of a functional configuration of an allocation device according to the example.

Referring to FIG. 2, the functional configuration of the allocation device according to the example is described. FIG. 2 is a diagram illustrating an example of the functional configuration of the allocation device according to the example. As illustrated in FIG. 2, the allocation device 10 includes an interface unit 11, a storage unit 12, and a control unit 13.

The interface unit 11 is an interface for inputting and outputting data to and from an input/output device and communicating data with other devices. For example, the interface unit 11 inputs and outputs data to and from an input device such as a keyboard and a mouse, an output device such as a display and a speaker, and an external storage device such as a USB memory. For example, the interface unit 11 is a network interface card (NIC), and communicates data through the Internet.

The storage unit 12 is an example of a storage device that stores therein data and computer programs executed by the control unit 13. Examples of the storage unit 12 include a hard disk and a memory. The storage unit 12 stores classification model information 121 and a segment information table 122 therein.

The classification model information 121 is parameters of a classification model. Examples of the classification model information 121 include parameters that can be learned, such as the weights and biases of DNN. Thus, the classification model information 121 is updated each time the classification model is learned. The segment information table 122 is a table used in postprocessing for allocating segment labels. The data structure of the segment information table 122 is described later together with a procedure of the postprocessing.

For example, the control unit 13 is implemented when a central processing unit (CPU), a micro processing unit (MPU), or a graphics processing unit (GPU) executes a computer program stored in an internal storage device by using a RAM as a workspace. For example, the control unit 13 may be implemented by an integrated circuit such as an application specific integrated circuit (ASIC) and a field programmable gate array (FPGA). The control unit 13 includes a dividing unit 131, a classification unit 132, a calculation unit 133, a data label allocating unit 134, an update unit 135, and a segment label allocating unit 136.

The dividing unit 131, the classification unit 132, the calculation unit 133, and the data label allocating unit 134 perform processing using a classification model. The dividing unit 131, the classification unit 132, the calculation unit 133, and the data label allocating unit 134 can perform the same processing as processing described in chapter 4 in Yamamuro Saeru, Matsubara Yasuko, Kawabata Kouki, Ide Yusuke, Umeda Yuhei, Furukawa Tadanobu, Okawa Yoshihiro, Maruhashi Koji, Inakoshi Hiroya, Sakurai Yasushi, "Summarization and classification of time-series data using deep learning", DEIM Forum 2018 C3-3.

The dividing unit 131 divides each of a plurality of pieces of time-series data into a plurality of segments. The classification unit 132 classifies the segments into a plurality of clusters based on features of time-series data in each segment. The data label allocating unit 134 allocates a label to each of the pieces of time-series data based on the features of each segment of the time-series data. The calculation unit 133 calculates the degree of importance of each of segments in the processing by the data label allocating unit 134. The data label allocating unit 134 is an example of a first allocating unit.

For example, the data label allocating unit 134 can allocate a label by using a neural network having a recurrent neural network (RNN) layer and an attention that outputs weights for weighting the output of the RNN layer in units of segments. In this case, the calculation unit 133 can calculate the output of the attention as the degree of importance.

The update unit 135 performs learning processing. In the learning processing, first, the data label allocating unit 134 uses a classification model to allocate a data label to time-series data allocated with a correct data label in advance. The update unit 135 optimizes parameters of the classification model, that is, the classification model information 121, based on a difference between the allocated data label and the correct data label. In prediction processing, the data label allocating unit 134 uses the learned classification model to allocate a data label to time-series data whose correct data label is unknown.

Figure 3:
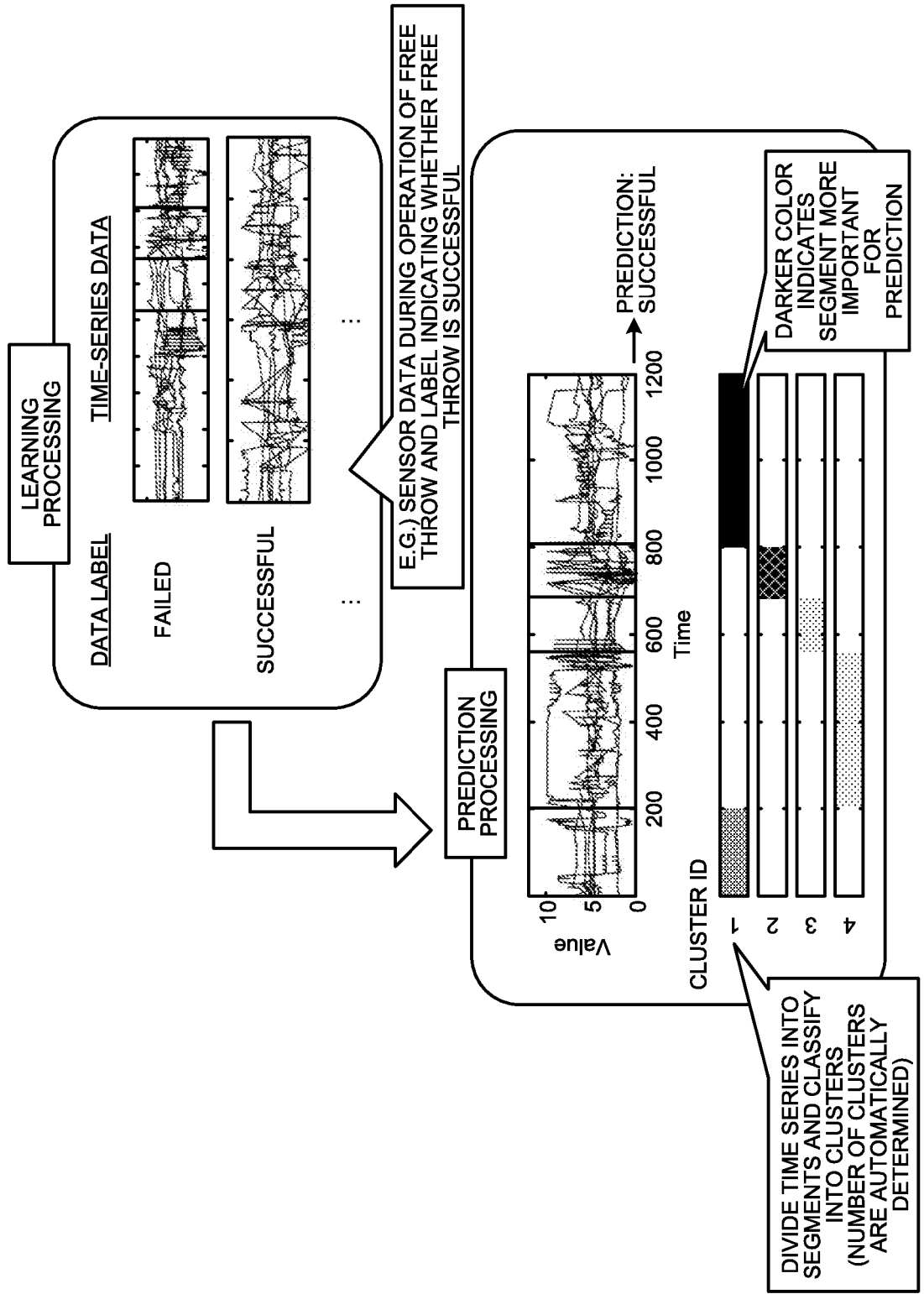
FIG. 3 is a diagram for describing a classification model.

Referring to FIG. 3, a classification model is described. FIG. 3 is a diagram for describing the classification model. In the example in FIG. 3, time-series data is sensor data obtained from an acceleration sensor worn by a player who shoots a free throw. A data label is information indicating whether the free throw is successful or failed.

In the learning processing, the allocation device 10 learns the classification model by using time-series data allocated with "successful" or "failed" in advance as a data label. In the prediction processing, the allocation device 10 predicts whether a data label of time-series data whose correct data label is unknown is "successful" or "failed".

In the prediction processing, the allocation device 10 uses the learned classification model to divide time-series data whose data label is unknown into segments and classify each segment into a cluster. Furthermore, the allocation device 10 uses the learned classification model to calculate the degree of importance of each segment and predict a data label. Although the description is omitted, the learning processing involves dividing of segments, classifying into a cluster, calculating of the degree of importance similarly to the prediction processing.

In the example in FIG. 3, segments are indicated by different colors. A segment that is more important for prediction is displayed by a darker color. For example, FIG. 3 indicates that a segment from time 800 to time 1200 is classified into a cluster whose cluster ID is 1 and has the highest degree of importance. The degree of importance can also translate as the degree of contribution for prediction.

The data label allocating unit 134 stores the allocation results of data labels in the segment information table 122. Referring to FIG. 4, the segment information table 122 is described. FIG. 4 is a diagram illustrating an example of the segment information table.

As illustrated in FIG. 4, the data label allocating unit 134 stores the results of allocating data labels of a plurality of pieces of time-series data including time-series data d1 and time-series data d2 in the segment information table 122. The time-series data includes time and at least one type of value for each time. Items of the segment information table 122 include a time-series data name, segment start time, segment end time, a cluster ID, a degree of importance, and a predicted data label.

For example, the first record in the segment information table 122 in FIG. 4 indicates that a segment from time 0 to time 100 in the time-series data d1 has a cluster ID of 1, a degree of importance of 0.8, and an allocated data label "a".

The segment label allocating unit 136 allocates a label based on the cluster and the degree of importance for a plurality of segments. For example, the segment label allocating unit 136 allocates a predetermined segment in time-series data with a label allocated to the time-series data to which the segment belongs. The segment label allocating unit 136 is an example of a second allocating unit.

The segment label allocating unit 136 can allocate a label such that when the degree of importance of a segment becomes higher, the same label as that of time-series data to which the segment belongs is more likely to be allocated.

Figure 5:
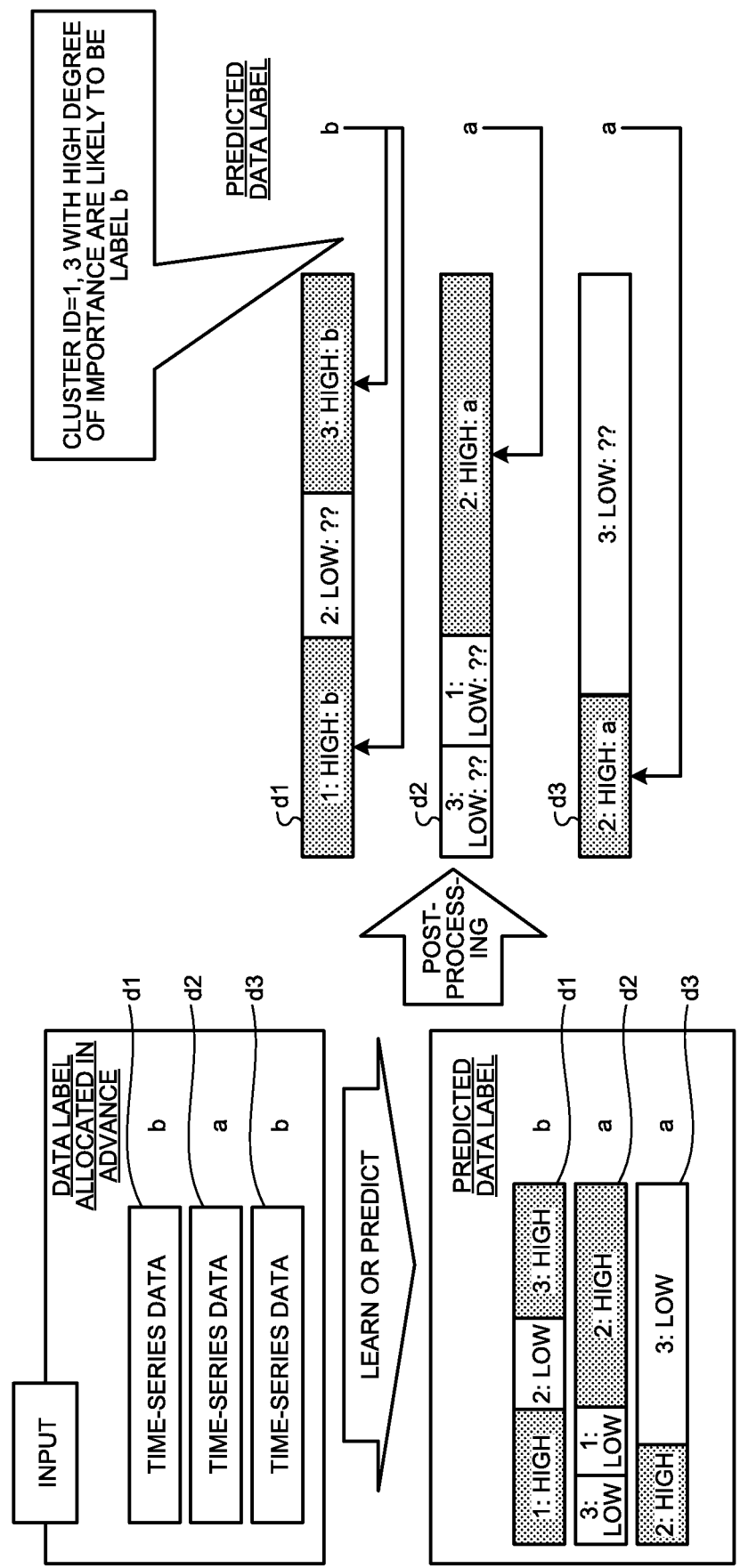
FIG. 5 is a diagram for describing a method for allocating a label to a segment having a high degree of importance.

FIG. 5 is a diagram for describing a method for allocating a label to a segment having a high degree of importance. As illustrated in FIG. 5, first, the allocation device 10 allocates a predicted data label to each piece of time-series data.

In FIG. 5 and other figures, information on segments is indicated by "cluster ID:high/low degree of importance: segment label". For example, "1:high" means that the cluster ID of the segment is 1 and the degree of importance is high. For example, "3:high:b" means that the cluster ID of the segment is 3, the degree of importance is high, and the segment label is "b". A high degree of importance of the segment may correspond to the state in which the degree of importance of the segment is equal to or higher than a predetermined threshold or the state in which the rank of the magnitude of the degree of importance of the segment is equal to or higher than a predetermined rank.

In the following description, segments in time-series data are referred to as the first segment, the second segment, the third segment, and so on in order from the left. In the example in FIG. 5, the degrees of importance of the first segment and the third segment in time-series data d1 are high. Thus, the segment label allocating unit 136 allocates the first segment and the third segment in the time-series data d1 with "b", which is a data label, as a segment label.

When the time-series data d1 has a segment classified into the same cluster as the segment allocated with the segment label, the segment label allocating unit 136 also allocates the segment with the same segment label. In other words, the segment label allocating unit 136 allocates segment labels in units of clusters.

On the other hand, the segment label allocating unit 136 can allocate a label such that when the degree of importance of a segment becomes lower, a label of time-series data different from a label allocated to time-series data to which the segment belongs is more likely to be allocated.

Figure 6:
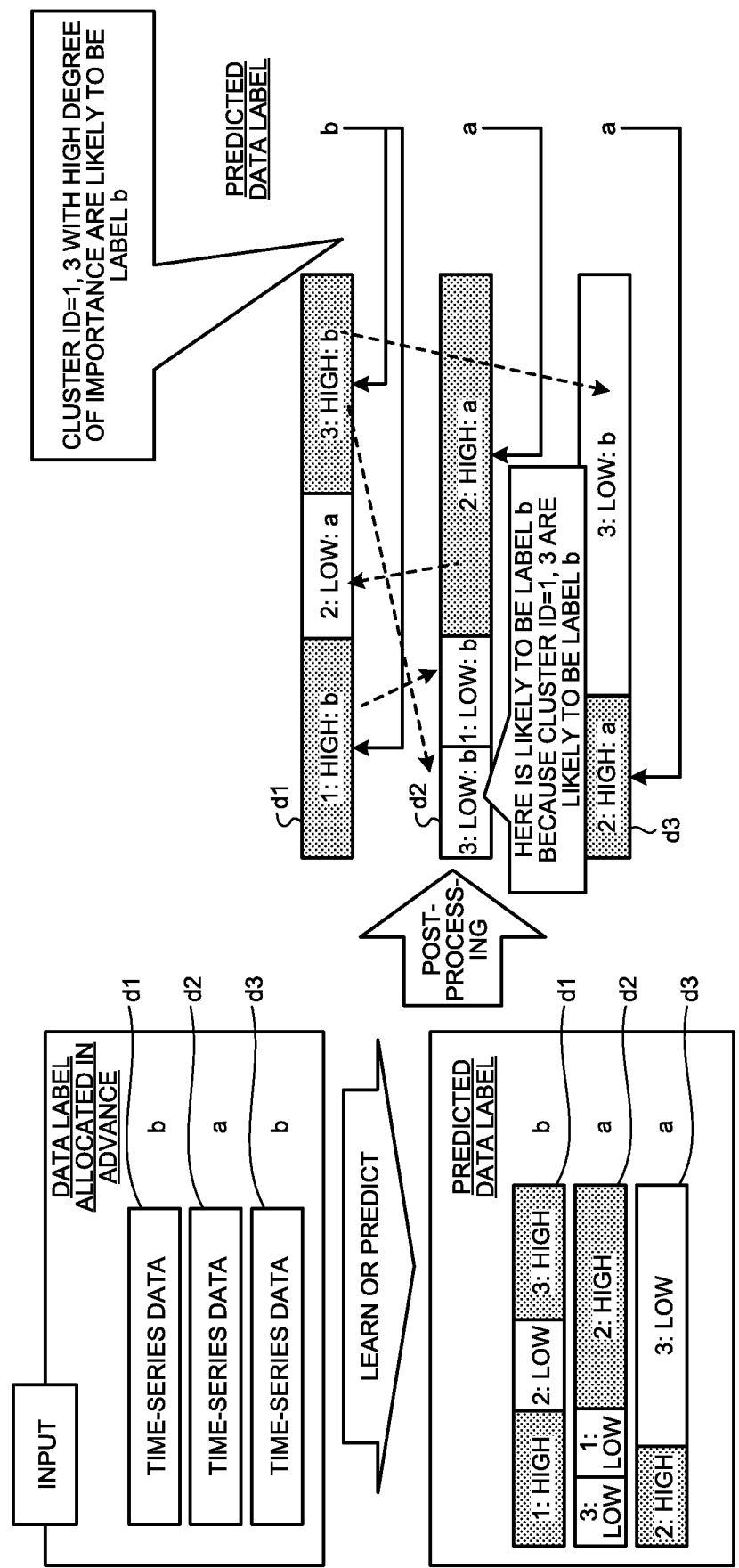
FIG. 6 is a diagram for describing a method for allocating a label to a segment having a low degree of importance.

FIG. 6 is a diagram for describing a method for allocating a label to a segment having a low degree of importance. A segment having a low degree of importance is a segment other than a segment having a high degree of importance. As illustrated in FIG. 6, the segment label allocating unit 136 allocates a segment having a low degree of importance with a segment label allocated to a segment that is in time-series data different from time-series data to which the segment belongs and that is classified into the same cluster.

For example, in the example in FIG. 6, the second segment in time-series data d1 has a low degree of importance and a cluster ID of 2. The third segment in time-series data d2 has a high degree of importance and a cluster ID of 2, and is allocated with a segment label "a". Thus, the segment label allocating unit 136 allocates the second segment in the time-series data d1 with the same segment label "a" as that of the third segment in the time-series data d2.

When the classification model is a neural network having an RNN layer and an attention that outputs weights for weighting the output of the RNN layer in units of segments, the segment label allocating unit 136 allocates a label by using the output of the attention as the degree of importance.

The method for allocating segment labels is not limited to the one described above with reference to FIG. 5 and FIG. 6. For example, the segment label allocating unit 136 can allocate segment labels by a counting method or a sorting method.

Counting Method

Figure 7:
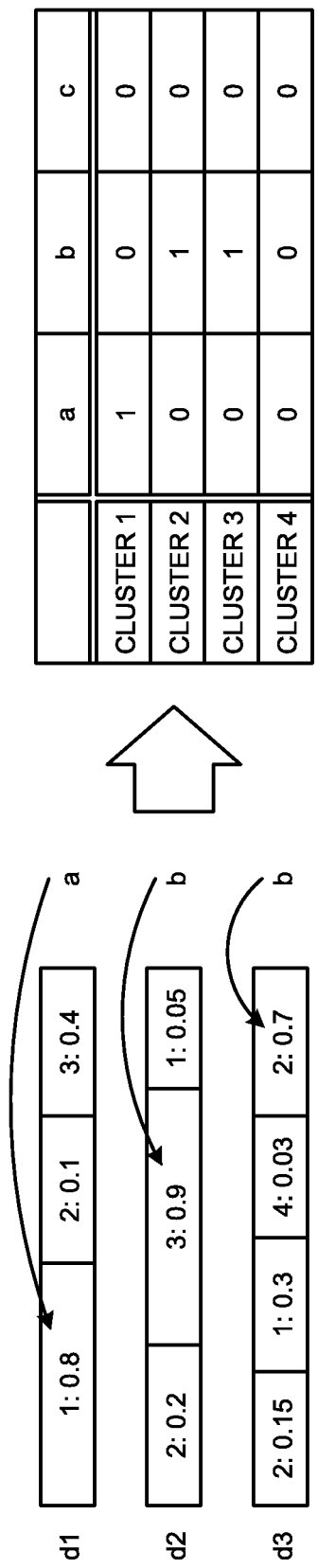
FIG. 7 is a diagram for describing counting in a counting method.

First, the counting method is described. In the counting method, the segment label allocating unit 136 calculates a score (hereinafter, "count") for each combination of a cluster and a label. In this case, the segment label allocating unit 136 performs processing called "counting" on a segment having the highest degree of importance in each piece of time-series data. FIG. 7 is a diagram for describing counting in the counting method.

Counting is described. When the degree of importance of each of segments is the highest among segments in time-series data to which the segments belong, the segment label allocating unit 136 increments a count of a label allocated to the time-series data corresponding to a cluster to which the segment is classified. The segment label allocating unit 136 allocates each of the segments with a label having the largest count corresponding to a cluster to which the segments are classified among clusters.

In the example in FIG. 7, the first segment among segments in time-series data d1 has the highest degree of importance. The first segment in the time-series data d1 is classified into a cluster whose cluster ID is 1. Thus, the segment label allocating unit 136 adds 1 to a count of a combination of the cluster whose cluster ID is 1 (cluster 1) and a data label "a" allocated to the time-series data d1. Similarly, the segment label allocating unit 136 adds 1 to a count of a combination of a cluster 2 and a label "b" and a count of a combination of a cluster 3 and the label "b".

The segment label allocating unit 136 refers to the added counts to allocate, for all pieces of time-series data, a segment label "a" to segments classified into the cluster 1. The segment label allocating unit 136 allocates a segment label "b" to segments classified into the cluster 2. The segment label allocating unit 136 allocates a segment label "b" to segments classified into the cluster 3.

Figure 8:
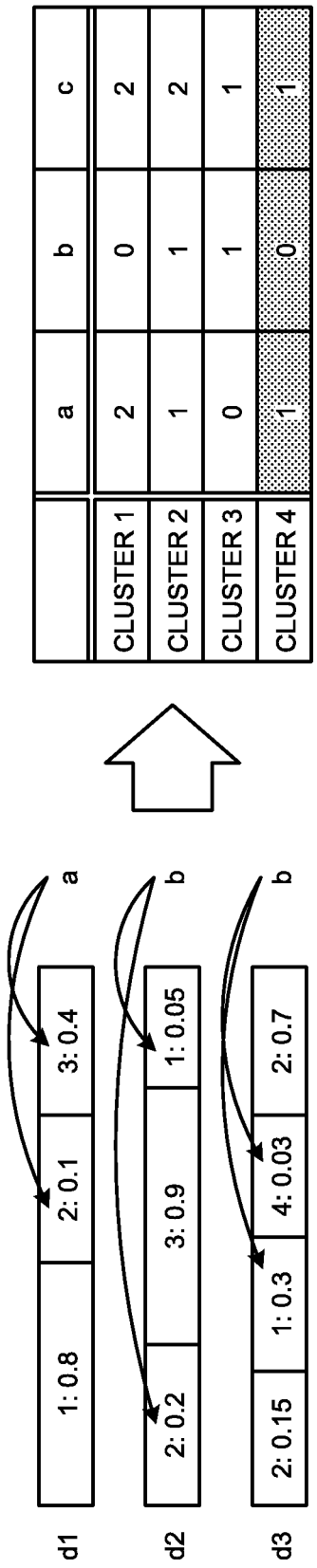
FIG. 8 is a diagram for describing tie-break counting in a counting method.

At this time, the allocation of segment labels to segments classified into any of the cluster 1, the cluster 2, and the cluster 3 is completed. On the other hand, in the example in FIG. 7, a segment label is not allocated to segments classified into a cluster 4. When there is a segment that has not been allocated with a segment label as a result of the counting, the segment label allocating unit 136 performs tie-break counting. FIG. 8 is a diagram for describing tie-break counting in the counting method.

Tie-break counting is described. The segment label allocating unit 136 performs tie-break counting when a plurality of segments are not segments belonging to a cluster having the highest degree of importance among segments in time-series data to which the segments belong. In this case, the segment label allocating unit 136 increments counts of labels other than a label allocated to the time-series data corresponding to the cluster to which the segments are classified.

In the example in FIG. 8, the second segment and the third segment among segments in time-series data d1 are not segments having the highest degree of importance in the time-series data d1. The second segment in the time-series data d1 belongs to the cluster 2. The third segment in the time-series data d1 belongs to the cluster 3. Data labels other than a data label allocated to the time-series data d1 are "b" and "c". Thus, the segment label allocating unit 136 adds 1 to counts of a combination of the cluster 2 and the label "b", a combination of the cluster 2 and the label "c", a combination of the cluster 3 and the label "b", and a combination of the cluster 3 and the label "c".

Similarly, the segment label allocating unit 136 performs tie-break counting for time-series data d3. In this case, the segment label allocating unit 136 adds 1 to counts of a combination of the cluster 4 and the label "a" and a combination of the cluster 4 and the label "c".

The segment label allocating unit 136 refers to the added counts, and allocates, for every pieces of time-series data, a segment label "a" or a segment label "c" to the segments classified into the cluster 4. In this case, which of the segment label "a" and the segment label "c" is to be finally selected may be determined in random order, or may be determined in accordance with a predetermined order of priority.

Sorting Method

Next, the sorting method is described. In the sorting method, the segment label allocating unit 136 sequentially allocates labels to a plurality of segments in descending order of the degree of importance. In this case, when a label corresponding to a cluster to which each segment is classified has not been allocated, the segment label allocating unit 136 allocates a label allocated to time-series data to which the segment belongs to the cluster.

Specifically, first, as illustrated in FIG. 9, the segment label allocating unit 136 sorts the segment information table 122 in descending order of the degree of importance. FIG. 9 is a diagram for describing sorting in the sorting method.

As illustrated in FIG. 10, the segment label allocating unit 136 refers to records in the segment information table 122 from the top in order. The segment label allocating unit 136 allocates a predicted data label to a first-appeared cluster, that is, a cluster in which segment labels are not allocated to classified segments as a segment label. Furthermore, the segment label allocating unit 136 does not allocate a segment label to an already-appeared cluster, that is, a cluster in which segment labels are allocated to classified segments.

In the example in FIG. 10, first, the segment label allocating unit 136 refers to a record in the first row, and changes segment labels in records corresponding to all segments classified into a cluster whose cluster ID is 3 to "b". Next, the segment label allocating unit 136 refers to a record in the second row, and changes segment labels in records corresponding to all segments classified into a cluster whose cluster ID is 1 to "a". Furthermore, the segment label allocating unit 136 refers to a record in the third row, and changes segment labels in records corresponding to all segments classified into a cluster whose cluster ID is 2 to "b".

Records in the fourth to ninth rows correspond to already-appeared clusters. The segment label allocating unit 136 refers to a record in the tenth row, and changes segment labels in records corresponding to all segments classified into a cluster whose cluster ID is 4 to "b". Note that the record whose segment label is to be changed is only one record in the example in FIG. 10.

Flow of Processing

Referring to flowcharts, the flow of each processing is described. As indicated by a segment information table T, a data set D, a cluster k, a label l, time-series data d, a count Nkl, and a segment s, the information is provided with symbols as appropriate for description.

Figure 11:
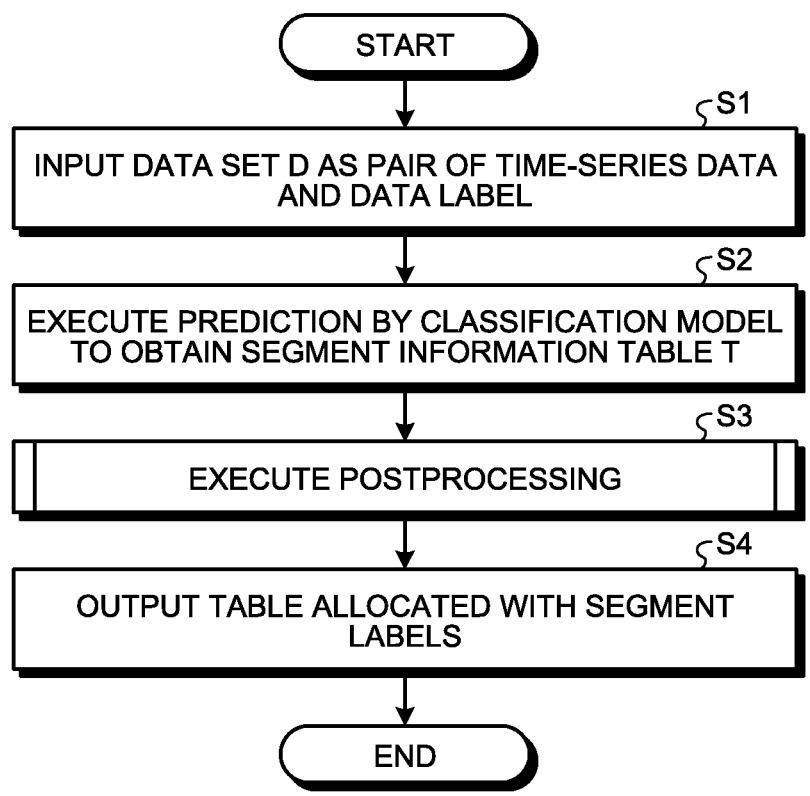
FIG. 11 is a flowchart illustrating the flow of allocation processing.

Referring to FIG. 11, the flow of processing for allocating a segment label by the allocation device 10 is described. FIG. 11 is a flowchart illustrating the flow of the allocation processing. As illustrated in FIG. 11, first, the allocation device 10 receives input of a data set D, which is a pair of time-series data and a data label (Step S1). Next, the allocation device 10 executes prediction using a classification model, and obtains a segment information table T (Step S2).

The allocation device 10 executes postprocessing for allocating segment labels (Step S3). The allocation device 10 outputs a table in which a segment and an allocated segment label are associated with each other (Step S4).

Counting Method

Figure 12:
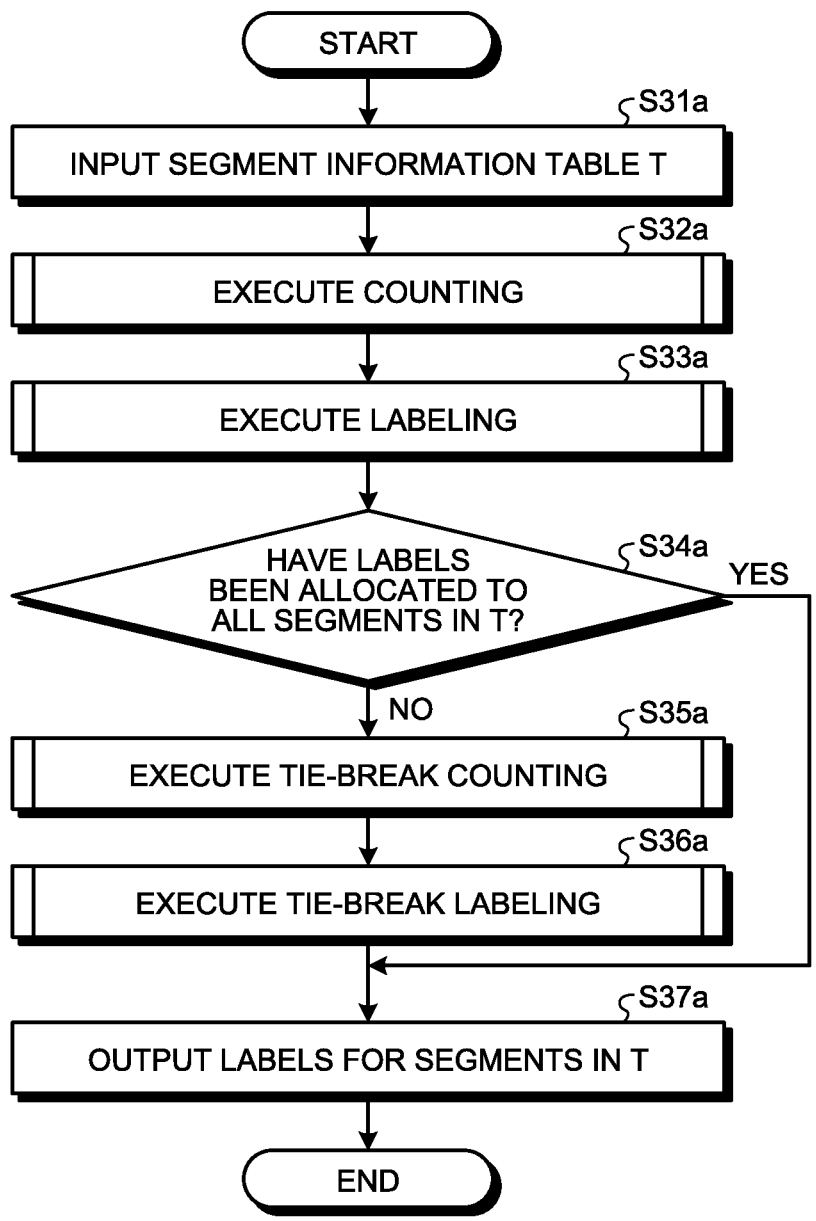
FIG. 12 is a flowchart illustrating the flow of postprocessing by the counting method.

Next, the flow of postprocessing (Step S3 in FIG. 11) is described. Referring to FIG. 12, the flow of postprocessing by a counting method is described. FIG. 12 is a flowchart illustrating the flow of the postprocessing by the counting method.

As illustrated in FIG. 12, the allocation device 10 receives input of a segment information table T created based on each piece of time-series data (Step S31a). Next, the allocation device 10 executes counting (Step S32a). The allocation device 10 executes labeling based on the result of counting (Step S33a).

The allocation device 10 determines whether labels have been allocated to all segments in the segment information table T (Step S34a). When labels have been allocated to all segments in the segment information table T (Yes at Step S34a), the allocation device 10 outputs the label for each segment in T (Step S37a), and finishes the postprocessing by the counting method.

On the other hand, when labels have not been allocated to all segments in the segment information table T (No at Step S34a), the allocation device 10 executes tie-break counting (Step S35a) and tie-break labeling (Step S36a). After that, the allocation device 10 outputs the label for each segment in T (Step S37a), and finishes the postprocessing by the counting method.

The flow of counting (Step S32a in FIG. 12), labeling (Step S33a in FIG. 12), tie-break counting (Step S35a in FIG. 12), and tie-break labeling (Step S36a in FIG. 12) is described.

Figure 13:
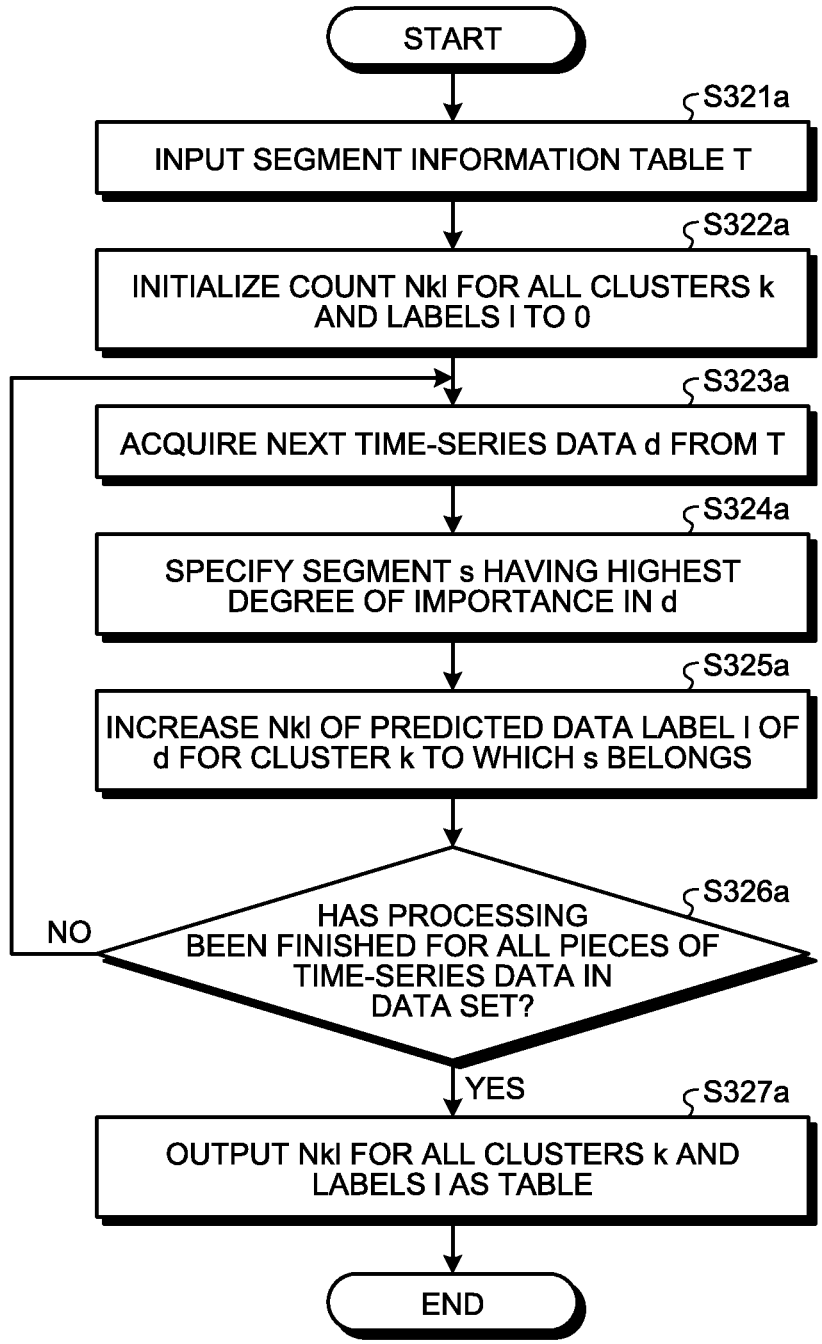
FIG. 13 is a flowchart illustrating the flow of counting.

First, the flow of counting is described with reference to FIG. 13. FIG. 13 is a flowchart illustrating the flow of counting. As illustrated in FIG. 13, first, the allocation device 10 receives input of a segment information table T (Step S321a). Next, the allocation device 10 initializes a count Nkl for all clusters k and labels l to 0 (Step S322a).

The allocation device 10 acquires time-series data one by one from T. The allocation device 10 acquires the next time-series data d from unacquired time-series data (Step S323a). The allocation device 10 specifies a segment s having the highest degree of importance in d (Step S324a). The allocation device 10 increases Nkl of a predicted data label of d for a cluster k to which s belongs (Step S325a).

The allocation device 10 determines whether the processing has been completed for all pieces of time-series data in the data set (Step S326a). When the processing has been completed for all pieces of time-series data (Yes at Step S326a), the allocation device 10 outputs Nkl for all clusters k and labels l as a table (Step S327a). On the other hand, when the processing has not been completed for all pieces of time-series data (No at Step S326a), the allocation device 10 returns to Step S323a to repeat the processing.

Figure 14:
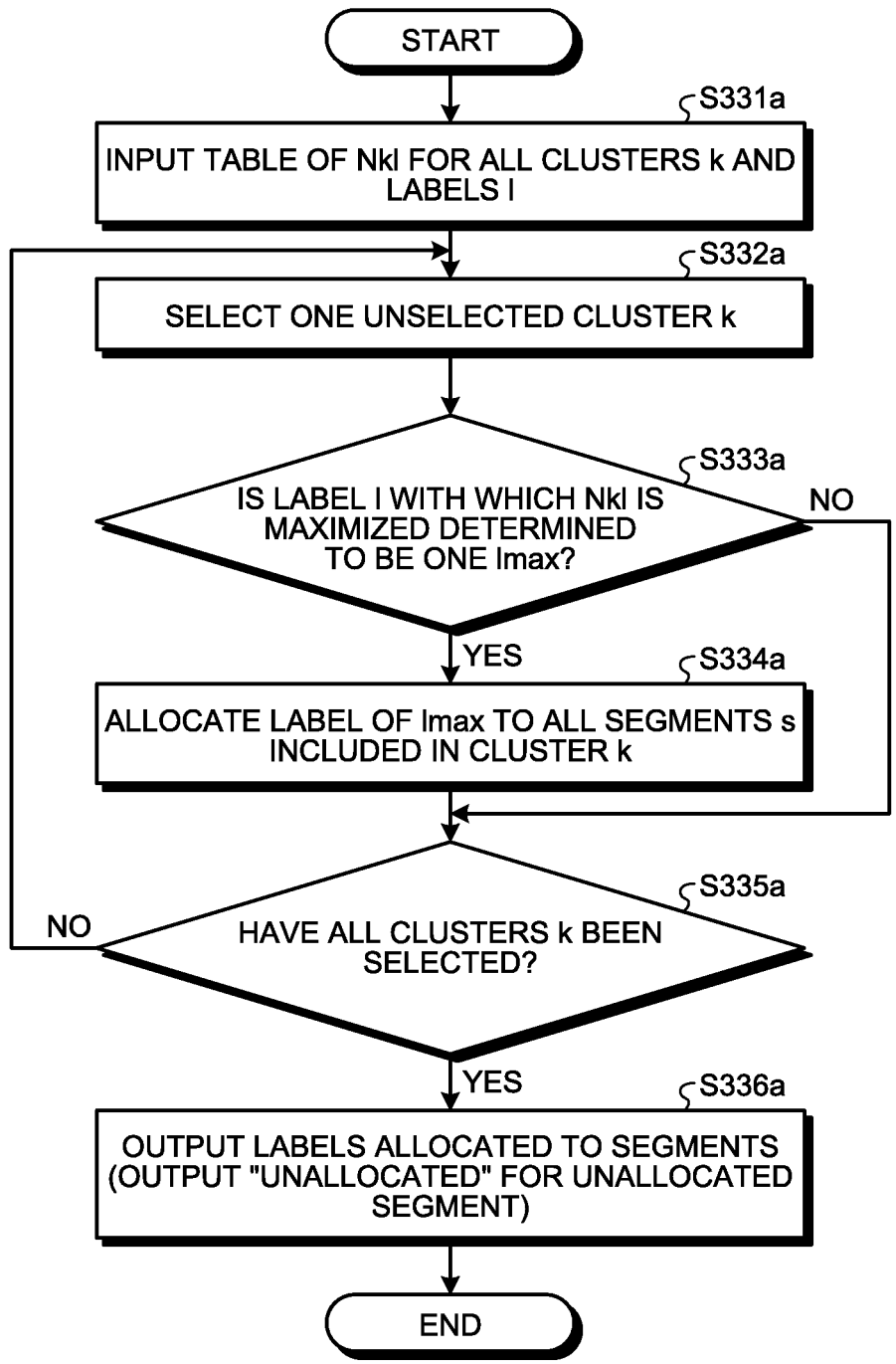
FIG. 14 is a flowchart illustrating the flow of labeling.

Next, the flow of labeling is described with reference to FIG. 14. FIG. 14 is a flowchart illustrating the flow of labeling. As illustrated in FIG. 14, first, the allocation device 10 receives input of a table of Nkl for all clusters k and labels l (Step S331a). The table is a table output in counting.

The allocation device 10 selects clusters k one by one from the table. The allocation device 10 selects one unselected cluster k (Step S332a). The allocation device 10 determines whether a label l with which Nkl for the selected cluster k is maximized is determined to one lmax (Step S333a).

When lmax with which Nkl for the selected cluster k is maximized is determined to one lmax (Yes at Step S333a), the allocation device 10 allocates labels of lmax to all segments s included in the cluster k (Step S334a). On the other hand, when lmax with which Nkl for the selected cluster k is maximized is not determined to one lmax (No at Step S333a), the allocation device 10 proceeds to the next processing without allocating a label of lmax.

The allocation device 10 determines whether all clusters k have been selected (Step S335a). When all clusters k have been selected (Yes at Step S335a), the allocation device 10 outputs the labels allocated to the segments (Step S336a). In this case, the allocation device 10 outputs "unallocated" for a segment to which no label has been allocated. When all clusters k have not been selected (No at Step S335a), the allocation device 10 returns to Step S332a to repeat the processing.

Figure 15:
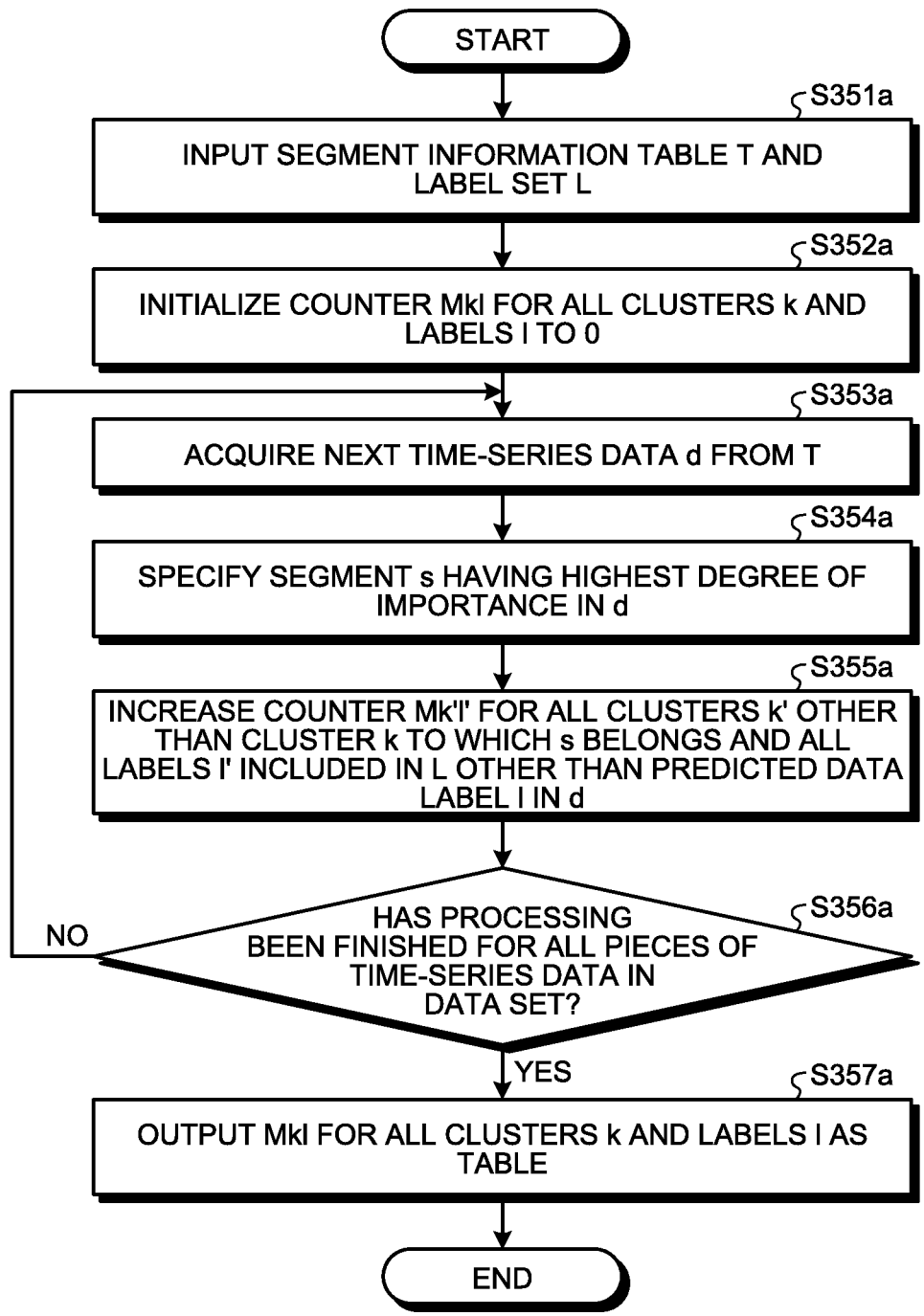
FIG. 15 is a flowchart illustrating the flow of tie-break counting.

Referring to FIG. 15, the flow of tie-break counting is described. FIG. 15 is a flowchart illustrating the flow of tie-break counting. As illustrated in FIG. 15, first, the allocation device 10 receives input of a segment information table T and a label set L (Step S351a). Next, the allocation device 10 initializes a count Mkl for all clusters k and labels l to 0 (Step S352a).

The allocation device 10 acquires time-series data one by one from T. The allocation device 10 acquires the next time-series data d from unacquired time-series data (Step S353a). The allocation device 10 specifies a segment s having the highest degree of importance in d (Step S354a).

The allocation device 10 increases a count Mk'l' for all clusters k' other than the cluster k to which s belongs and all labels l' included in L other than a predicted data label of d (Step S355a).

The allocation device 10 determines whether the processing has been completed for all pieces of time-series data in the data set (Step S356a). When the processing has been completed for all pieces of time-series data (Yes at Step S356a), the allocation device 10 outputs Mkl for all clusters k and labels l as a table (Step S357a). On the other hand, when the processing has not been completed for all pieces of time-series data (No at Step S356a), the allocation device 10 returns to Step S353a to repeat the processing.

Figure 16:
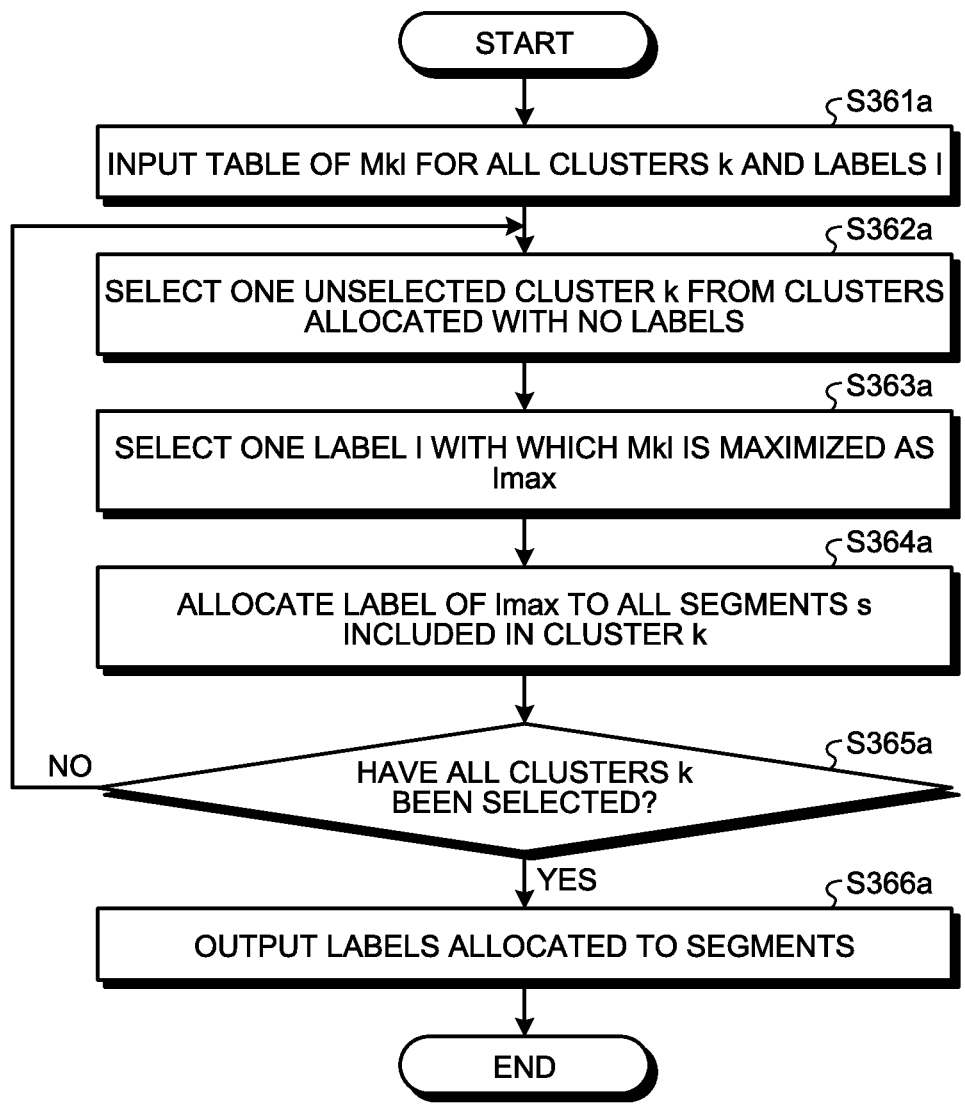
FIG. 16 is a flowchart illustrating the flow of tie-break labeling.

Next, the flow of tie-break labeling is described with reference to FIG. 16. FIG. 16 is a flowchart illustrating the flow of tie-break labeling. As illustrated in FIG. 16, first, the allocation device 10 receives input of a table of Mkl corresponding to all clusters k and labels l (Step S361a). The table is a table output in tie-break counting.

The allocation device 10 selects clusters k one by one from clusters to which labels have not been allocated. The allocation device 10 selects one unselected cluster k (Step S362a). The allocation device 10 selects one label l with which Mkl for the selected cluster k is maximized as lmax (Step S363a).

The allocation device 10 allocates labels of lmax to all segments s included in the cluster k (Step S364a). The allocation device 10 determines whether all clusters k have been selected (Step S365a). When all clusters k have been selected (Yes at Step S365a), the allocation device 10 outputs the labels allocated to the segments (Step S366a). In this case, the allocation device 10 outputs "unallocated" for a segment to which no label has been allocated. When all clusters k have not been selected (No at Step S365a), the allocation device 10 returns to Step S362a to repeat the processing.

Sorting Method

Figure 17:
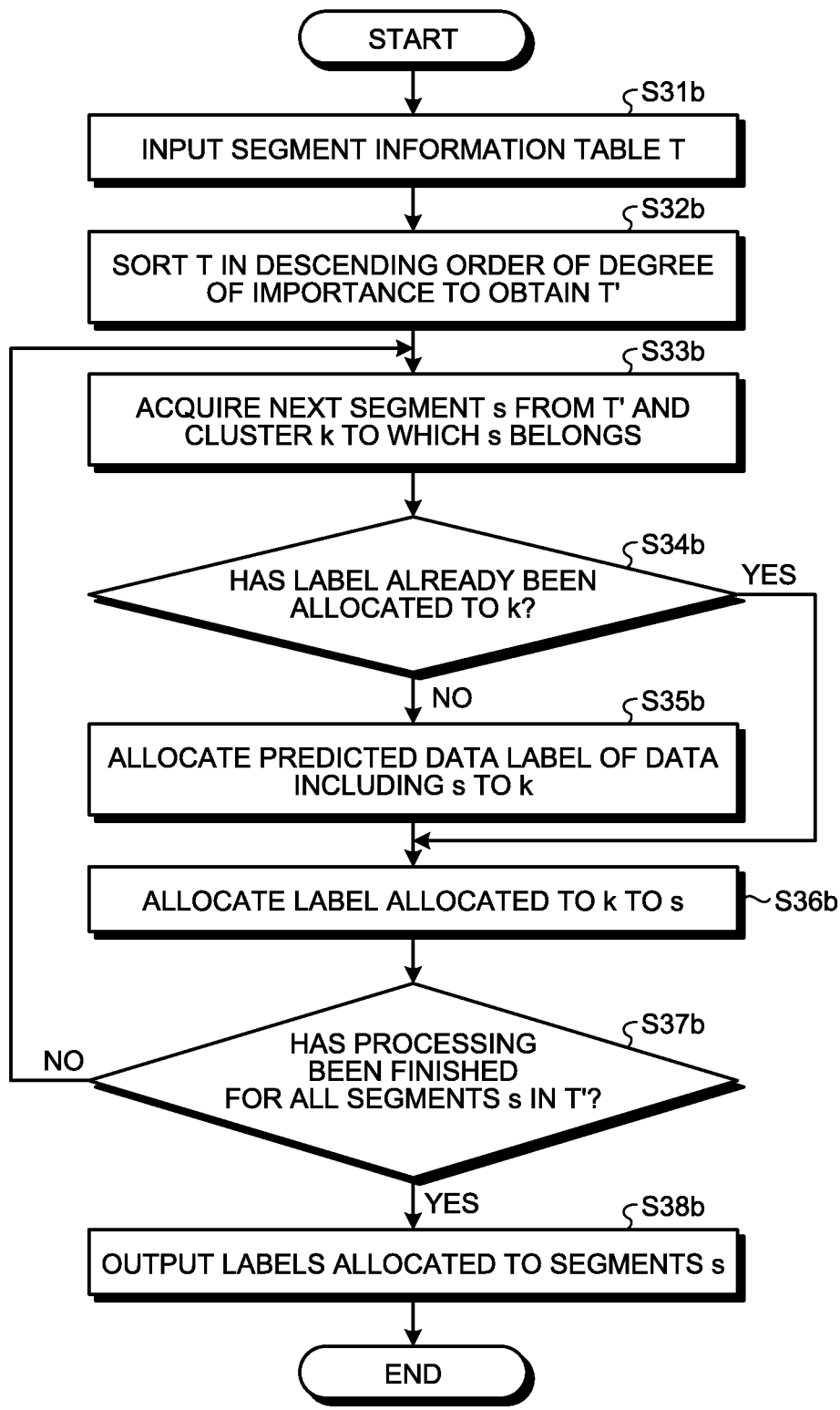
FIG. 17 is a flowchart illustrating the flow of postprocessing by the sorting method.

Next, the flow of postprocessing by a sorting method is described with reference to FIG. 17. FIG. 17 is a flowchart illustrating the flow of postprocessing by the sorting method. As illustrated in FIG. 17, first, the allocation device 10 receives input of a segment information table T (Step S31b). Next, the allocation device 10 sorts records in T in descending order of the degree of importance to obtain T' (Step S32b).

The allocation device 10 sequentially refers to segments in T'. The allocation device 10 acquires the next segment s and a cluster k to which s belongs from T' (Step S33b). The allocation device 10 determines whether a label has already been allocated to k (Step S34b). When a label has already been allocated to k (Yes at Step S34b), the allocation device 10 does not allocate a label to k, and proceeds to the next processing. On the other hand, when a label has not been allocated to k (No at Step S34b), the allocation device 10 allocates a predicted data label of data including s to k (Step S35b). The allocation device 10 allocates the label allocated to k to s (Step S36b).

Next, the allocation device 10 determines whether the processing has been finished for all segments s in T' (Step S37b). When the processing has been finished for all segments s in T' (Yes at Step S37b), the allocation device 10 outputs the labels allocated to the segments s (Step S38b). On the other hand, when the processing has not been finished for all segments s in T' (No at Step S37b), the allocation device 10 returns to Step S33b to repeat the processing.

Effects

As described above, the allocation device 10 divides each of pieces of time-series data into segments. The allocation device 10 allocates a label to each of the pieces of time-series data based on features of segments in the pieces of time-series data. The allocation device 10 allocates a predetermined segment in time-series data with a label allocated to time-series data to which the segment belongs. In this manner, the allocation device 10 can allocate a segment label based on a data label allocated to time-series data. In other words, the allocation device 10 can automatically allocate a segment label by using the output of the related technology (for example, DeepPlait described in Yamamuro Saeru, Matsubara Yasuko, Kawabata Kouki, Ide Yusuke, Umeda Yuhei, Furukawa Tadanobu, Okawa Yoshihiro, Maruhashi Koji, Inakoshi Hiroya, Sakurai Yasushi, "Summarization and classification of time-series data using deep learning", DEIM Forum 2018 C3-3). Thus, according to the examples, time-series data can be efficiently analyzed in detail.

The allocation device 10 calculates the degree of importance of each of segments in the allocation of a data label. The allocation device 10 allocates a label such that when the degree of importance of a segment becomes higher, the same label as that of time-series data to which the segment belongs is more likely to be allocated, and when the degree of importance of a segment becomes lower, a label different from a label allocated to time-series data to which the segment belongs is more likely to be allocated. In this manner, the allocation device 10 can allocate a segment label by using an allocated data label and the degree of importance calculated when allocating a data label. Thus, according to the examples, a segment label reflecting the degree of importance can be automatically allocated.

The allocation device 10 allocates a label by using a neural network having an RNN layer and an attention that outputs weights for weighting the output of the RNN layer in units of segments. The allocation device 10 allocates a label by using the output of the attention as the degree of importance. In this manner, the allocation device 10 can allocate a segment label by using a value obtained in the course of calculation of an existing model.

The allocation device 10 classifies segments into clusters based on features of time-series data in each segment. The allocation device 10 allocates a label based on a cluster and the degree of importance for segments. In this manner, the allocation device 10 can handle segments in units of clusters in an aggregated manner, and thus efficiently allocate a segment label.

When the degree of importance of each of segments is the highest among segments in time-series data to which the segments belong, the allocation device 10 increments a count of a label allocated to the time-series data corresponding to a cluster to which the segments are classified among clusters. The allocation device 10 allocates each of the segments with a label having the largest count corresponding to the cluster to which the segments are classified among the clusters. In this manner, the allocation device 10 can automatically calculate a score for allocating a segment label for a segment having the highest degree of importance.

When segments are not segments belonging to a cluster having the highest degree of importance among segments in time-series data to which the segments belong, the allocation device 10 increments counts of labels other than a label allocated to the time-series data corresponding to a cluster to which the segments are classified. In this manner, the allocation device 10 can automatically calculate a score for allocating a segment label even for segments other than a segment having the highest degree of importance.

The segment label allocating unit 136 allocates, for each segment, a label allocated to time-series data to which the segment belongs when a label corresponding to a cluster to which the segment is classified has not been allocated to the cluster sequentially in descending order of the degree of importance. In this manner, the allocation device 10 can collectively allocate segment labels in units of clusters.

In the above-mentioned example, the method in which the count of a cluster and a label is used as it is to allocate a segment label has been described. However, a segment label may be allocated after the count is further weighted. For example, the allocation device 10 may perform calculation after multiplying the count by a weight corresponding to the length of time for each segment.

System

The processing procedures, the control procedures, the specific names, and the information including various kinds of data and parameters described herein and illustrated in the drawings can be freely changed unless otherwise specified. The specific examples, distributions, and numerical values described above in the example are merely an example, and can be freely changed.

The components of the illustrated devices are conceptually illustrative, and do not always need to be physically configured as illustrated. In other words, a specific mode for dispersion and integration of the devices is not limited to the illustrated one. All or part of the devices can be functionally or physically dispersed and integrated in any unit depending on various kinds of loads and usage conditions. In addition, all or any part of the processing functions executed by the devices may be implemented by a CPU and computer programs analyzed and executed by the CPU, or implemented by hardware by wired logic.

Hardware

Figure 18:
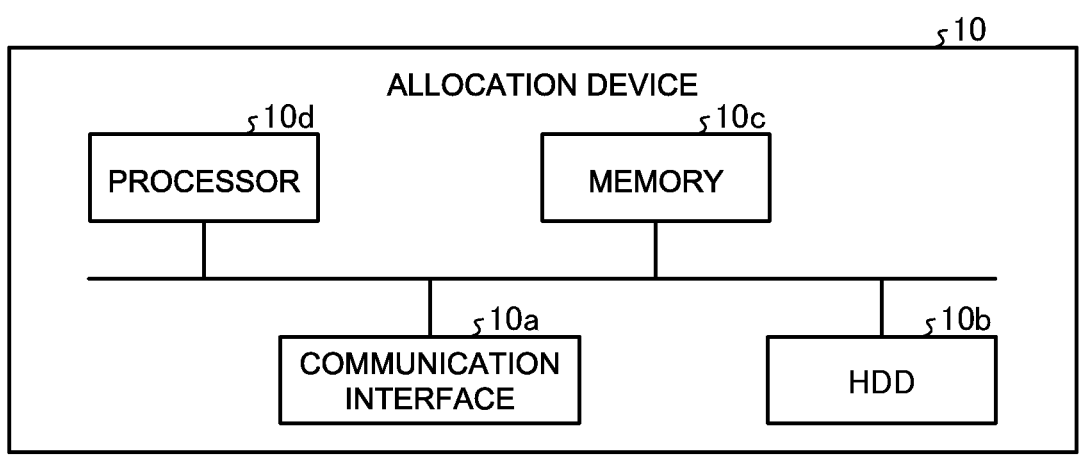
FIG. 18 is a diagram for describing a hardware configuration example.

FIG. 18 is a diagram for describing a hardware configuration example. As illustrated in FIG. 18, the allocation device 10 includes a communication interface 10a, a hard disk drive (HDD) 10b, a memory 10c, and a processor 10d. The units illustrated in FIG. 18 are mutually connected by a bus.

The communication interface 10a is a network interface card, and communicates with another server. The HDD 10b stores therein computer programs for operating the functions illustrated in FIG. 2 and DBs.

The processor 10d reads computer programs for executing the same processing as the processing units illustrated in FIG. 2 from the HDD 10b and deploys the computer programs onto the memory 10c, thereby operating a process for executing the functions described above with reference to FIG. 2. In other words, the process executes the same functions as the processing units in the allocation device 10. Specifically, the processor 10d reads computer programs having the same functions as the dividing unit 131, the classification unit 132, the calculation unit 133, the data label allocating unit 134, the update unit 135, and the segment label allocating unit 136 from the HDD 10b. The processor 10d executes a process for executing the same processing as the dividing unit 131, the classification unit 132, the calculation unit 133, the data label allocating unit 134, the update unit 135, and the segment label allocating unit 136. For example, the processor 10d is a hardware circuit such as a CPU, an MPU, and an ASIC.

As described above, the allocation device 10 operates as an information processing device that executes the classification method by reading and executing a computer program. The allocation device 10 may implement the same functions as in the above-mentioned example by reading the computer program from a recording medium by a medium reading device and executing the read computer program. Computer programs in other examples are not limited to the ones to be executed by the allocation device 10. For example, the present invention can be similarly applied to the case where another computer or a server executes computer programs and the case where the computer and the server execute computer programs in a cooperative manner.

The computer programs can be distributed through a network such as the Internet. The computer programs can be recorded in a computer-readable recording medium such as a hard disk, a flexible disk (FD), a CD-ROM, a magneto-optical disk (MO), and a digital versatile disc (DVD), and executed by being read from the recording medium by a computer.

According to one aspect, time-series data can be efficiently analyzed in detail.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An analysis method executed by a computer, the analysis method comprising:
dividing each piece of time-series data, of a plurality of pieces of time-series data, into a plurality of segments;
allocating a label to each piece of time-series data, of the plurality of pieces of time-series data, based on features of each segment;
allocating a predetermined segment in a piece of time-series data, included in the plurality of pieces of time-series data, with a label allocated to the piece of time-series data to which the predetermined segment belongs;
calculating a degree of importance of each of the segments at the allocating the label to each piece of time-series data;
classifying the segments into a plurality of clusters based on features of the time-series data in each segment; and
learning a classification model, and classifying pieces of time-series data whose labels are unknown, by processing machine learning using the pieces of time-series data with the label allocated to the predetermined segment, wherein
the allocating the predetermined segment with the label includes allocating a label such that:
in a case that the degree of importance of a segment becomes higher, a same label as a label of time-series data to which the segment belongs is more likely to be allocated, and
in a case that the degree of importance of the segment becomes lower, a label different from the label allocated to the time-series data to which the segment belongs is more likely to be allocated, and
the allocating the predetermined segment with the label includes allocating a label based on a cluster and a degree of importance for the segments.

2. The analysis method according to claim 1, wherein
the allocating the label to each piece of time-series data includes allocating the label by using a neural network including a recurrent neural network (RNN) layer and an attention that outputs weighting for weighting output of the recurrent neural network layer in units of segments, and
the allocating the predetermined segment with the label includes allocating the label by using the output of the attention as a degree of importance.

3. The allocation analysis method according to claim 1, further including incrementing, in a case that the degree of importance of each of the segments is highest among segments in time-series data to which the segment belongs, a count of a label allocated to the time-series data corresponding to a cluster to which the segment is classified among the clusters, wherein
the allocating the predetermined segment with the label includes allocating each of the segments with a label including a largest count corresponding to the cluster to which the segment is classified among the clusters.

4. The analysis method according to claim 3, wherein the incrementing includes incrementing, in a case that the segments are not segments belonging to a cluster including a highest degree of importance among segments in time-series data to which the segments belong, counts of labels other than a label allocated to the time-series data corresponding to the cluster to which the segments are classified.

5. The analysis method according to claim 3, wherein for each of the segments, in a case that a label corresponding to a cluster to which the segment is classified has not been allocated, a label allocated to time-series data to which the segment belongs is allocated to the cluster sequentially in a descending order of the degree of importance.

6. A non-transitory computer-readable recording medium storing therein executable instructions that cause a computer to execute an analysis process comprising:
dividing each piece of time-series data, of a plurality of pieces of time-series data, into a plurality of segments;
allocating a label to each piece of time-series data, of the plurality of pieces of time-series data, based on features of each segment;
allocating a predetermined segment in a piece of time-series data, included in the plurality of pieces of time-series data, with a label allocated to the piece of time-series data to which the predetermined segment belongs;
calculating a degree of importance of each of the segments at the allocating the label to each piece of time-series data;
classifying the segments into a plurality of clusters based on features of the time-series data in each segment; and
learning a classification model, and classifying pieces of time-series data whose labels are unknown, by processing machine learning using the pieces of time-series data with the label allocated to the predetermined segment, wherein
the allocating the predetermined segment with the label includes allocating a label such that:
in a case that the degree of importance of a segment becomes higher, a same label as a label of time-series data to which the segment belongs is more likely to be allocated, and
in a case that the degree of importance of the segment becomes lower, a label different from the label allocated to the time-series data to which the segment belongs is more likely to be allocated, and
the allocating the predetermined segment with the label includes allocating a label based on a cluster and a degree of importance for the segments.

7. An analysis device, comprising:
a processor configured to:
divide each piece of time-series data, of a plurality of pieces of time-series data, into a plurality of segments;
allocate a label to each piece of time-series data, of the plurality of pieces of time-series data, based on features of each segment;
allocate a predetermined segment in a piece of time-series data, included in the plurality of pieces of time-series data, with a label allocated to the piece of time-series data to which the predetermined segment belongs;
calculate a degree of importance of each of the segments at the allocation of the label to each piece of time-series data;
classify the segments into a plurality of clusters based on features of the time-series data in each segment; and
learn a classification model, and classify pieces of time-series data whose labels are unknown, by processing machine learning using the pieces of time-series data with the label allocated to the predetermined segment, wherein
the processor allocates the predetermined segment with the label by allocating a label such that:
in a case that the degree of importance of a segment becomes higher, a same label as a label of time-series data to which the segment belongs is more likely to be allocated, and
in a case that the degree of importance of the segment becomes lower, a label different from the label allocated to the time-series data to which the segment belongs is more likely to be allocated, and
the processor allocates the predetermined segment with the label by allocating a label based on a cluster and a degree of importance for the segments.

* * * * *